US009077448B2

(12) United States Patent
Hathorn et al.

(10) Patent No.: US 9,077,448 B2
(45) Date of Patent: Jul. 7, 2015

(54) READ OPTICAL POWER LINK SERVICE FOR LINK HEALTH DIAGNOSTICS

(75) Inventors: Roger G. Hathorn, Tucson, AZ (US); Raymond Michael Higgs, Poughkeepsie, NY (US); George Peter Kuch, Poughkeepsie, NY (US); Louis William Ricci, Hyde Park, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 239 days.

(21) Appl. No.: 13/592,550

(22) Filed: Aug. 23, 2012

(65) Prior Publication Data

US 2014/0055776 A1    Feb. 27, 2014

(51) Int. Cl.
G01M 11/00 (2006.01)
H04B 10/077 (2013.01)
H04B 10/079 (2013.01)
H04L 12/26 (2006.01)

(52) U.S. Cl.
CPC .......... *H04B 10/0775* (2013.01); *G01M 11/30* (2013.01); *H04B 10/0795* (2013.01); *H04B 10/07955* (2013.01); *H04L 43/0805* (2013.01)

(58) Field of Classification Search
None
See application file for complete search history.

(56) References Cited

U.S. PATENT DOCUMENTS

| | | | |
|---|---|---|---|
| 4,829,596 A * | 5/1989 | Barina | 398/29 |
| 4,994,675 A * | 2/1991 | Levin et al. | 250/551 |
| 5,396,357 A | 3/1995 | Goossen et al. | |
| 5,423,006 A * | 6/1995 | Brown et al. | 710/19 |
| 5,487,120 A | 1/1996 | Choy et al. | |
| 5,627,842 A * | 5/1997 | Brown et al. | 714/727 |
| 5,793,481 A * | 8/1998 | Leali | 356/73.1 |
| 5,825,949 A | 10/1998 | Choy et al. | |
| 6,115,361 A * | 9/2000 | Fredericks et al. | 370/242 |
| 6,434,716 B1 * | 8/2002 | Johnson et al. | 714/712 |
| 6,490,253 B1 | 12/2002 | Miller et al. | |
| 6,549,310 B1 | 4/2003 | Kuchta et al. | |
| 6,609,165 B1 * | 8/2003 | Frazier | 710/36 |
| 6,850,360 B1 | 2/2005 | Chen et al. | |
| 7,558,874 B1 * | 7/2009 | Kodukula et al. | 709/237 |
| 7,721,164 B2 * | 5/2010 | Dickens et al. | 714/715 |
| 7,757,020 B2 * | 7/2010 | Sharma et al. | 710/60 |
| 7,779,306 B1 | 8/2010 | Philbin et al. | |
| 2002/0152338 A1 * | 10/2002 | Elliott et al. | 710/34 |
| 2003/0030860 A1 * | 2/2003 | Mellert et al. | 359/110 |
| 2003/0030861 A1 * | 2/2003 | Mellert et al. | 359/110 |
| 2003/0056153 A1 * | 3/2003 | Beer et al. | 714/43 |
| 2004/0208519 A1 * | 10/2004 | Feldman et al. | 398/30 |
| 2005/0060598 A1 * | 3/2005 | Klotz et al. | 714/4 |

(Continued)

FOREIGN PATENT DOCUMENTS

| | | |
|---|---|---|
| EP | 2413518 A1 | 2/2012 |
| JP | 2002374271 A | 12/2002 |
| WO | 2006003164 A1 | 1/2006 |

OTHER PUBLICATIONS

Barker, Jr., Charles R., Intermediate Level Maintenance Fibre Channel Testing, 509-530, Institute of Electrical and Electronics Engineers, 2002.

*Primary Examiner* — Gordon J Stock, Jr.
(74) *Attorney, Agent, or Firm* — Griffiths & Seaton PLLC

(57) ABSTRACT

A method is provided for monitoring a state of an optical link in a Fiber Channel infrastructure and includes sending an Extended Link Service (ELS) request to read an optical power of the optical link, and diagnosing a degradation of the optical link, based on a response to the ELS request.

17 Claims, 4 Drawing Sheets

(56) References Cited

U.S. PATENT DOCUMENTS

| | | | |
|---|---|---|---|
| 2006/0285494 A1* | 12/2006 | Li et al. | 370/235 |
| 2008/0301204 A1* | 12/2008 | Chodacki et al. | 707/205 |
| 2008/0304824 A1* | 12/2008 | Barbieri et al. | 398/38 |
| 2009/0263126 A1 | 10/2009 | Mercier et al. | |
| 2010/0113084 A1* | 5/2010 | Kelly | 455/522 |
| 2011/0110662 A1* | 5/2011 | Wellbrock et al. | 398/45 |
| 2012/0089853 A1* | 4/2012 | Henderson et al. | 713/322 |
| 2013/0016964 A1* | 1/2013 | Mu et al. | 398/1 |

\* cited by examiner

READ OPTICAL POWER LINK SERVICE FOR LINK HEALTH DIAGNOSTICS

BACKGROUND OF THE INVENTION

1. Field of the Invention

The present invention relates in general to Fibre Channel infrastructures and, more particularly, to link service commands for Fibre Channel infrastructures.

2. Description of the Related Art

A Storage Area Network (SAN) is a high speed communication network or a subnetwork for transferring data between a server and a storage system. A SAN establishes coupling between a server and a storage device through a dedicated Fiber Channel (FC) switch via a connection relationship. The SAN isolates a storage device from the server, such that more than one server can share the storage device without use of a dedicated intermediate server. SAN storage devices are made up of one or more disk devices, generally referred to as a disk array, for storing computer data and have interfaces that are, among other things, Fiber Channel (FC) compatible.

FC interfaces communicate according to FC protocol standards, which govern how signals are transmitted over various transmission media including fiber optic cable or twisted pair copper cables, for example. In some configurations, FC interfaces further communicate according to Fibre Channel over the Ethernet (FCoE) protocol standards, which encapsulates Fibre Channel (FC) frames in Ethernet frames to allow an Ethernet network to communicate with low latency, high performance networks, such as Fibre Channel.

SUMMARY OF THE INVENTION

As data rates increase, greater susceptibility to link issues can often result within the SAN. For example, in configurations in which connection cables are fiber optic cables, optical link errors may arise due to a variety of reasons including, but not limited to degraded connections between one or more Fibre Channel ports and the fiber optic cable, faulty cabling, or poor transmission. To identify the source of the link issue and a resolution to the issue, various data is required for assessment. In some cases, optical power is required for evaluation.

Innovative methods, systems, and computer program products are provided for monitoring optical power in a storage area network. In one embodiment, by way of example only, a method is provided for monitoring a state of an optical link in a Fibre Channel infrastructure and includes sending an Extended Link Service (ELS) request to read an optical power of the optical link, and diagnosing a degradation of the optical link, based on a response to the ELS request.

In another embodiment, by way of example only, a system is provided for detecting an optical link error in a Fibre Channel or Fibre Channel over Ethernet infrastructure. The system includes a plurality of optical links and a controller in communication with the plurality of optical links. The controller is configured to send an Extended Link Service (ELS) request to read an optical power of one or more optical links of the plurality of optical links, and diagnose a degradation of the optical link, based on a response to the ELS request.

In still another embodiment, by way of example only, physical computer-readable storage medium includes a computer program product for monitoring a state of an optical link in a Fibre Channel infrastructure. The storage medium includes instructions for sending an Extended Link Service (ELS) request to read an optical power of the optical link, and diagnosing a degradation of the optical link, based on a response to the ELS request.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide methods, systems, and computer-readable storage media for monitoring a state of an optical link in a Fibre Channel (FC) fabric. In an embodiment, a method includes sending an Extended Link Service (ELS) request to read an optical power of the optical link, and diagnosing a degradation of the optical link, based on a response to the ELS request.

Figure 1:
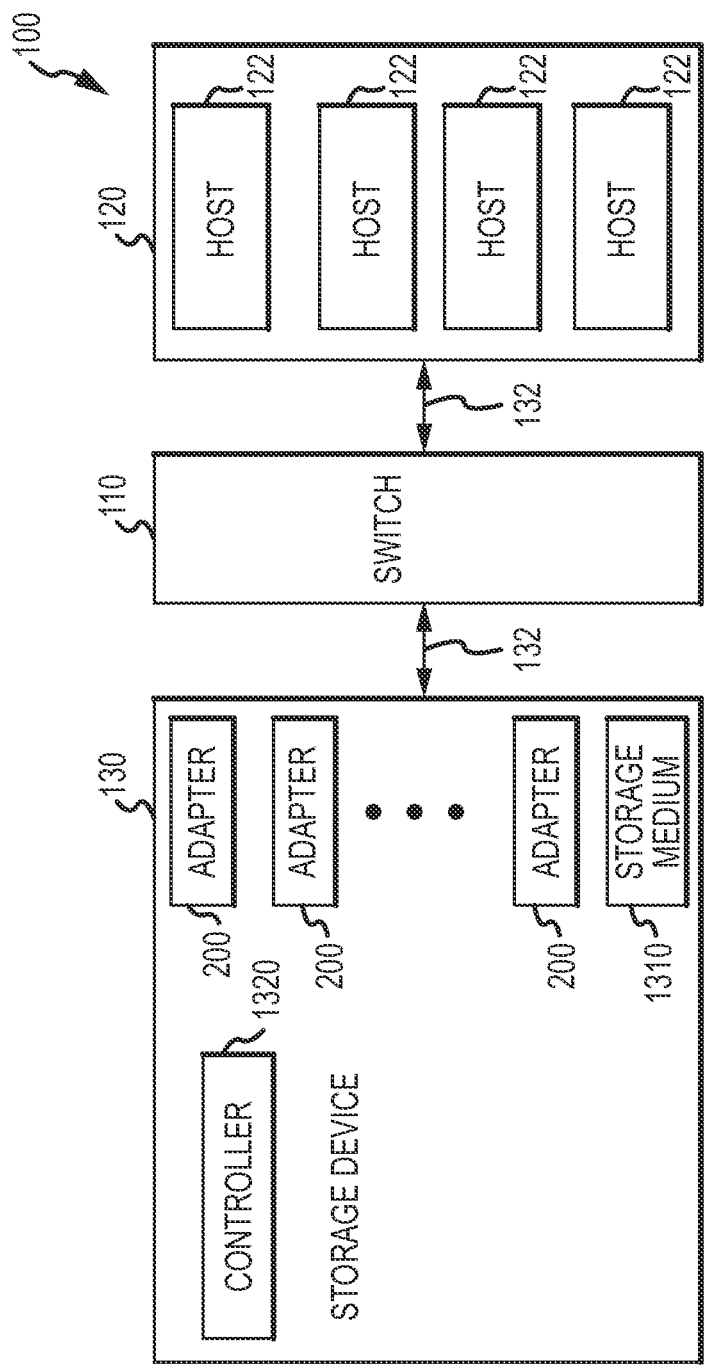
FIG. 1 is a block diagram of a storage system, according to an embodiment.

Turning now to the figures, FIG. 1 is a block diagram of one embodiment of a storage system 100. At least in the illustrated embodiment, system 100 is configured to operate according to FC standards and comprises a switch 110 coupling one or more hosts 122 of a storage area network 120 to a storage device 130 via one or more connections 132 including one or more fiber optic cables or other connections providing optical links. Switch 110 operates to link hosts 122 and storage device 130 together to form a FC network. Although FIG. 1 shows system 100 as only including a single switch 110, various other embodiments of system 100 include more than one switch 110. In addition, although FIG. 1 shows hosts 122 directly coupled to storage device 130 via switch 110, various other embodiments of system 100 are configured such that switch 110 not only forms a portion of the FC network, but also at least a portion of another network (e.g., a WAN, a LAN, the Internet, Ethernet etc.) through which hosts 122 and storage device 130 are capable of communicating with one another.

Hosts 122 are each computing devices or computer systems that serve as hosts or "clients" of storage device 130. Although FIG. 1 shows system 100 as only including four hosts 122, various other embodiments of system 100 include fewer or more hosts 122 in communication with storage device 130.

To communicate with FC devices, e.g. hosts 122, of SAN 120, storage device 130 comprises a computer-readable storage medium 1310, a controller 1320, and one or more adapters 200. Computer-readable storage medium 1310 may be any type of computer-readable storage medium known in the art or developed in the future. For example, computer-readable storage medium 1310 may comprise storage tape, an optical storage device, one or more disk storage devices (e.g., a RAID configuration, a JBOD configuration, etc.), and/or the like. In an embodiment, storage device 130 includes more than one computer-readable storage media 1310. In at least one of these embodiments, storage device 130 includes at least two different types of computer-readable storage media 1310.

Processor 1320 may be any type of processor or processing portion of a device known in the art or developed in the future capable of performing input/output (I/O) operations on storage medium 1310 via adapters 200. Although FIG. 1 shows storage device 130 as including a single processor 1320, various other embodiments of storage device 130 include more than one processor 1320. Adapters 200 are configured to be compatible with and to link to FC devices via optical links 132. Although three adapters 200 are illustrated, other embodiments of storage device 130 include fewer or more than three adapters 200.

Figure 2:
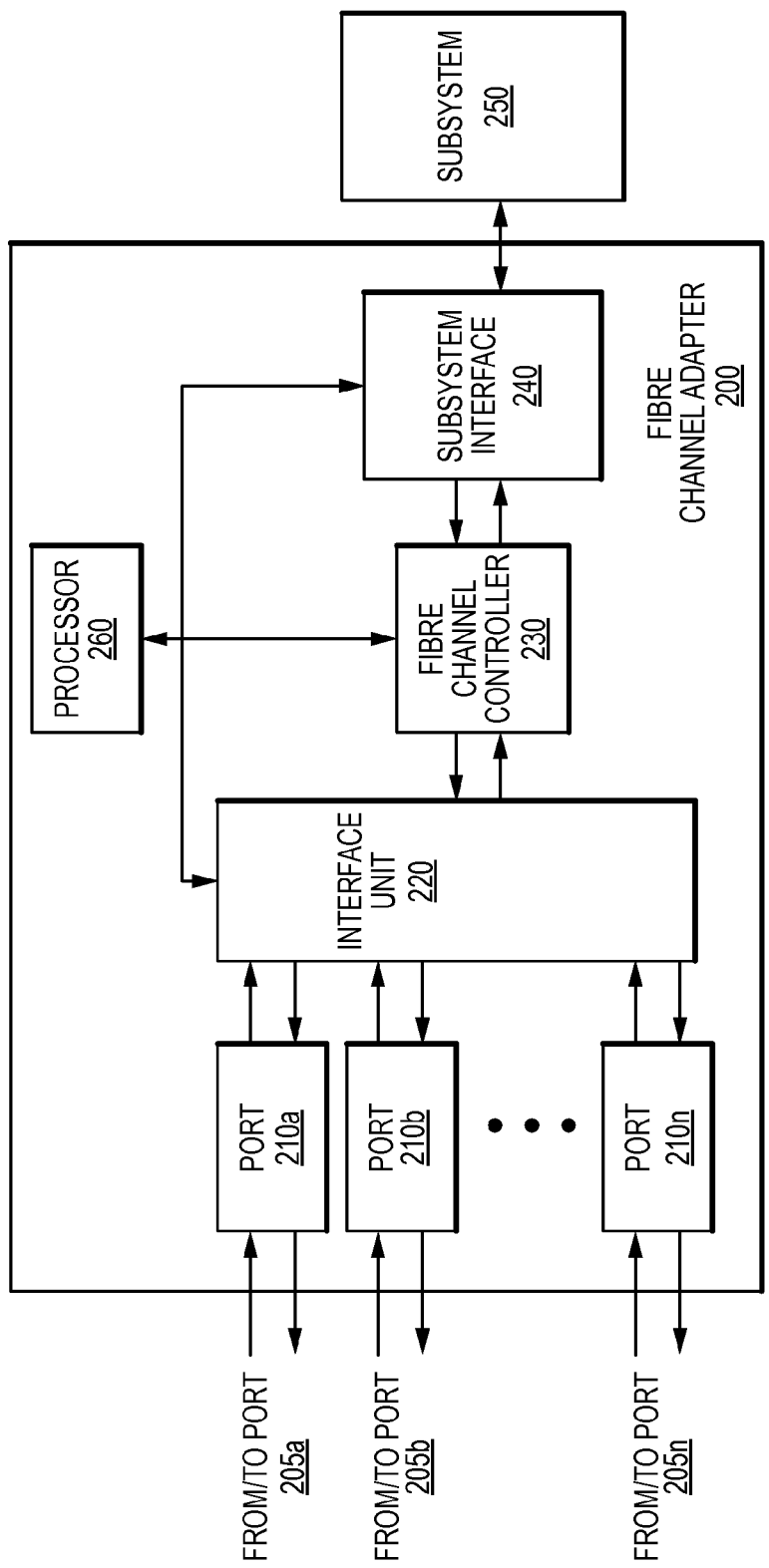
FIG. 2 is a block diagram of a Fibre Channel adapter, according to an embodiment.

FIG. 2 is a block diagram of a FC adapter 200, according to an embodiment. A first FC port 205a is electrically or optically connected to an associated port 210a of adapter 200. Similarly, ports 205b and 205n are associated with ports 210b and 210n, respectively. One or more of ports 205a-n may be integrated into or associated with a connected device, such as an additional storage component. Alternatively, the connected device may have an additional FC adapter 200 in which ports 205a-n are integrated. For example, port 210a may accept a first FC cable and port 210b may accept a second FC cable to connect the first and second cables together. In any case, each of ports 210a-n is configured to provide access to bi-directional input/output (I/O) data links to provide mechanisms by which host requests for access to the resources of a SAN (e.g., hosts 122) and/or link service commands can be received by and/or sent to any port of associated storage devices (e.g., storage devices 130).

To facilitate communication, adapter 200 includes an interface unit 220, a FC controller 230, a processor 260, and a subsystem interface 240. FC controller 230 and/or processor 260 provide hardware mechanisms by which to execute various aspects of communication between adapter 200 and hosts 122. For example, processor 260 operably communicates with adapter 200 to send link service requests and responses. Subsystem interface 240 connects adapter 200 to subsystem 250, such as a particular storage environment of a storage area network.

Figure 3:
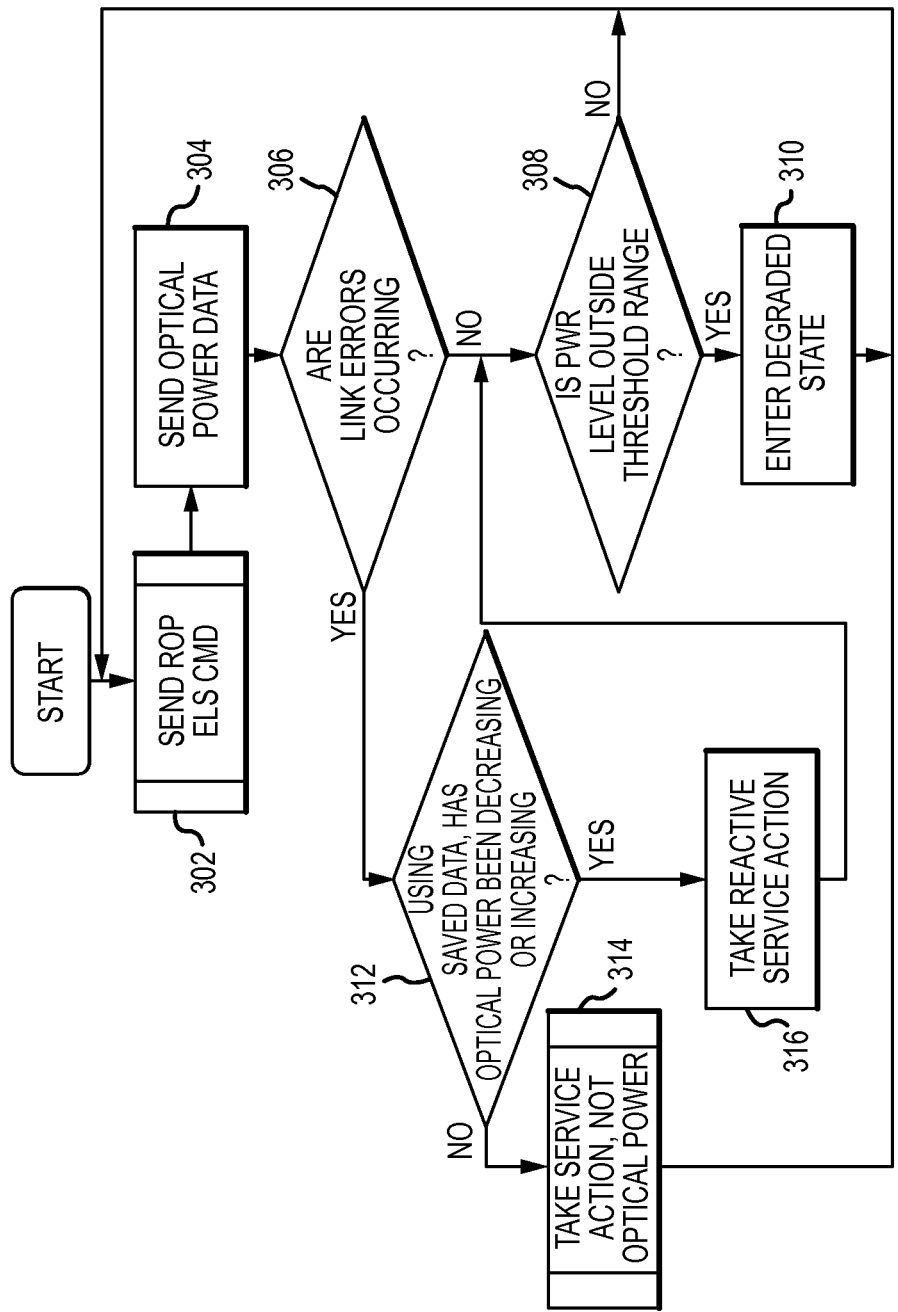
FIG. 3 is a flow diagram of a method of monitoring optical power across an optical link, according to an embodiment.

During operation after one or more of links are established connecting adapter 200 to switch 110 and/or storage media 120, link health diagnostics are run to identify if an error occurs between one or more optical links 132 and to identify where the fault is between the components. FIG. 3 is a flow diagram of a method 300 of monitoring a state of an optical link (e.g., link 132) in a Fibre Channel (FC) network, according to an embodiment. Method 300 can operate as a periodic process so that health diagnostics are continuously run and determination of link connection is constantly monitored. Alternatively, method 300 is invoked in response to another command or in response to an indication of a possible link issue.

Method 300 includes sending a Read Optical Power (ROP) Extended Link Service (ELS) command at 302. The ROP ELS command is sent from any port (i.e., source port) in the FC fabric to another port on a device in the FC fabric (i.e., destination port). In an example, one or more ports 210a-n sends the command. When addressing the ROP ELS command, a source identifier (S_ID) field designates the source port or FC end port (Nx_Port) requesting the Optical Power Block. The destination identifier (D_ID) field of the source port (Nx_Port) of the ROP ELS command is set to any Domain Controller well known address (FFFCxxh), in an embodiment. For example, the D_ID field is set to a Domain Controller of a switch in the SAN that is used for powering an end port of the switch that can provide Optical Power attributes or values for any port on the switch. In another embodiment, the D_ID field is set to an F_Port Controller well-known address (FFFFEh), which can be a Controller of a device at the other end of the optical link. In still another embodiment, the D_ID field is set to any Nx_Port logged in with the S_ID address or any end port in the SAN.

Figure 4:
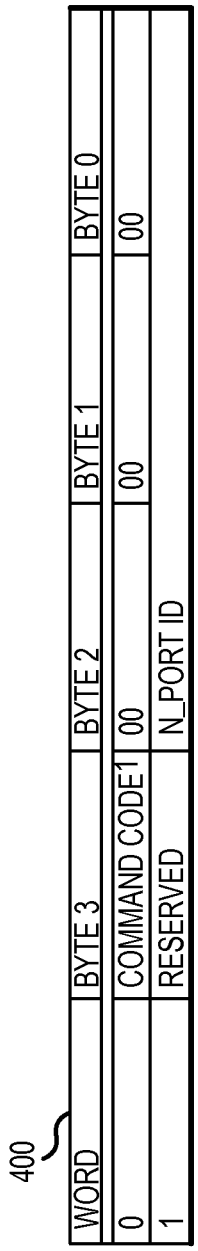
FIG. 4 is a block diagram of a read optical power extended link service payload, according to an embodiment.

An example of an ROP ELS payload 400 is shown in FIG. 4. The ROP ELS payload 400 is made up of Word 0 and Word 1. Byte 3 of Word 0 includes a command code 402, which, in an embodiment, is specified by ANSI/INCITS/T11 Standards to allow the optical link diagnostic application to send the request from ports via links. Bytes 0, 1, and 2 of Word 0 are set to 00. Byte 3 of Word 1 is reserved, and Bytes 0, 1, and 2 include the N_Port Identifier, which is used to identify the port for which optical power is to be provided when the ROP ELS request is sent to a domain controller address of a switch.

Figure 5:
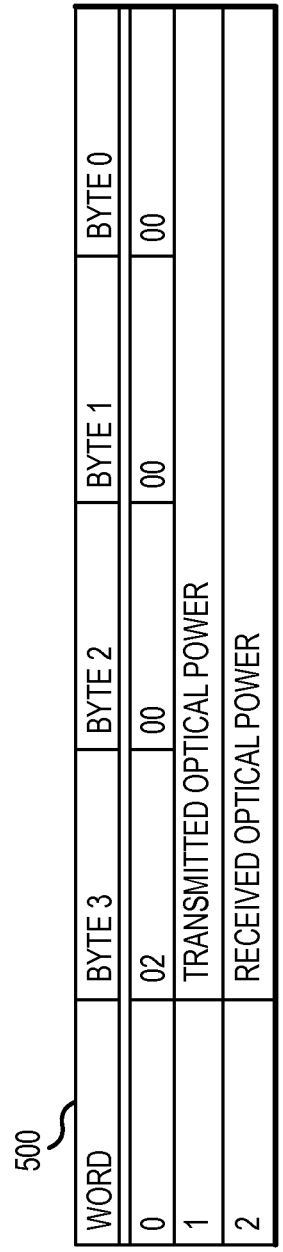
FIG. 5 is a block diagram of a link service acceptance payload, according to an embodiment.

Next, if Optical Power Block (OPB) data, containing optical power measurements, is received in response to the ROP ELS command, the OPB data is saved at 304. In an embodiment, an acceptance (LS_ACC) is received in response to the ELS request. The acceptance includes the OPB data and indicates that the request has been successfully received by the destination port. FIG. 5 is an LS_ACC payload 500 including Word 0, 1, and 2. Byte 3 of Word 0 is set to 02 indicating the LS_ACC ELS command code, while Bytes 0, 1, and 2 of Word 0 are set to 00. Bytes 0, 1, 2, and 3 of Word 1 includes the transmitted optical power. In an embodiment, the transmitted optical power is a 32 bit unsigned value that indicates the transmitted power in units of tenths of a milliwatt. Bytes 0, 1, 2 and 3 of Word 2 include the received optical power, which includes a 32 bit unsigned value that indicates the received power in units of tenths of a milliwatt. In other embodiments, the payload 500 also contains additional power attributes such as alarm settings or status associated with the optical link as provided by SFF standards. In such case, additional words, such as Word 3 and so on, are included.

In an embodiment, if the D_ID is a Domain Controller well known address (FFFCxxh) as noted above, the OPB is recognized when the N_Port ID field is set to an N_Port_ID within the associated domain. In such case, the OPB is the optical power for the F_Port that the N_Port_ID is logged in with. Alternatively, if the D_ID is the F_Port Controller well known address (FFFFEh), the N_Port_ID field is not meaningful. The OPB is the optical power read for the local Fx_Port that the S_ID is logged in with. In other embodiments, the OPB is identified when the N_Port_ID field is not meaningful and the OPB requested is associated to the Nx_Port assigned to the D_ID. In any case, the OPB is stored in a memory and is used to track optical power over time. In another embodiment, a reject (LS_RJT) is received in response to the ELS request due to, the port not supporting the ELS request, or another reason. In such case, method 300 iterates at 302 and sends another ELS request to another port.

After 304, a degradation of the optical link is diagnosed, based on a response to the ELS request. In particular, a determination is made as to whether a link error is occurring on the optical link at 306. If at 306 no link errors are occurring, a determination is then made as to whether the power level of the optical link is outside of a threshold range at 308. In an embodiment, the power level is outside of the threshold range if it is substantially equal to or below a low optical power level threshold or substantially equal to or above a high optical power level threshold. The low optical power level threshold is set to a predetermined lowest power level that allows the optical link to remain operational at a selected link speed. The high optical power level threshold is set to a predetermined highest power level that allows the optical link to remain operational at a selected link speed. Examples of power levels suitable for transmitting and receiving over an optical link are included in specification that define the use of optical links, such as FC-PI-x standards in T11 for Fibre Channel. Alternatively or in addition to the power levels, other diagnostic threshold levels can be considered when determining link error presence. For example, alarm settings and status are considered. These attributes are included as part of the OPB requested using the ROP command. If the optical power level is not outside of the threshold range, method 300 iterates at 302.

Alternatively, if the level is outside of the threshold range, a degraded state is indicated at 310. In such case, a proactive action is performed. Proactive action includes allowing the source port and destination port to renegotiate a tolerable lower link speed for transmitting and/or receiving data over the optical link. Proactive actions also include issuing a proactive service message, generating a link incident message, and displaying optical power reading history. The method 300 then iterates at 302.

In another embodiment, a link error is occurring at 306. In such case, an evaluation is performed as to whether the optical power has been decreasing or increasing at 312. For example, previously saved optical power data is compared with more recently collected optical power data. If the optical power has not been decreasing or increasing but the link error persists, service action is taken on the optical link at 314. In an example, decrease in optical power results from defective cabling, an issue at the transmission port, an issue at the receiving port, and/or dirt on the optical link. Once resolution of the link error is achieved, the method iterates at 302. If optical power has been decreasing or increasing, a reactive service action is taken at 316. For example, a service call is placed indicating optical power degradation. After the service call is placed and the optical power issue has been resolved, the method continues at 310.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A method of monitoring a state of an optical link in a Fibre Channel infrastructure, the method comprising:
   sending an Extended Link Service (ELS) request to read an optical power of the optical link;
   diagnosing a degradation of the optical link, based on a response to the ELS request;
   determining whether the optical power of the optical link is a cause of an occurring link error;
   if no link errors are occurring, determining whether the optical power of the optical link is outside of a threshold range including a low optical power level threshold and a high optical power level threshold; and
   renegotiating a lower link speed for the optical link, in response to the optical power of the optical link being outside of the threshold range.

2. The method of claim 1, wherein the low optical power level threshold is set to a predetermined lowest power level that allows the optical link to remain operational at a selected link speed and the high optical power level is set to a predetermined highest power level that allows the optical link to remain operational at the selected link speed.

3. The method of claim 1, further comprising indicating a degraded state, if the optical power of the optical link is outside of the threshold range.

4. The method of claim 1, further comprising determining whether the optical power of the optical link has been decreasing or increasing, if the step of diagnosing indicates a link error.

5. The method of claim 4, further comprising taking a service action not on the optical link, if a determination is made that the optical power of the optical link has not been decreasing or increasing.

6. The method of claim 4, further comprising performing a proactive action indicating optical power degradation, if a determination is made that the optical power of the optical link has been decreasing or increasing.

7. The method of claim 6, wherein performing a proactive action comprises a step selected from the group consisting of issuing a proactive service message, generating a link incident message, and displaying optical power reading history.

8. A system for detecting an optical link error in a Fibre Channel infrastructure or a Fibre Channel over Ethernet infrastructure including:
   a plurality of optical links; and
   a controller in communication with the plurality of optical links configured to:
      send an Extended Link Service (ELS) request to read an optical power of an optical link of the plurality of optical links;
      diagnose a degradation of the optical link, based on a response to the ELS request;
      determine whether the optical power of the optical link is a cause of an occurring link error;
      if no link errors are occurring, determine whether the optical power of the optical link is outside of a threshold range including a low optical power level threshold and a high optical power level threshold; and
      renegotiate a lower link speed for the optical link, in response to the optical power of the optical link being outside of the threshold range.

9. The system of claim 8, wherein the controller is further configured to indicate a degraded state, if the optical power of the optical link is outside of the threshold range.

10. The system of claim 8, wherein the controller is further configured to determine whether the optical power of the optical link has been decreasing or increasing, if a diagnosis indicates a link error.

11. The system of claim 10, wherein the controller is further configured to take a service action not on the optical link, if a determination is made that the optical power of the optical link has not been decreasing or increasing.

12. The system of claim 10, wherein the controller is further configured to perform a proactive action indicating optical power degradation, if a determination is made that the optical power of the optical link has been decreasing or increasing.

13. A non-transitory physical computer-readable storage medium comprising a computer program product for monitoring a state of an optical link in a Fibre Channel infrastructure, the non-transitory physical computer-readable storage medium including instructions for:
   sending an Extended Link Service (ELS) request to read an optical power of the optical link;
   diagnosing a degradation of the optical link, based on a response to the ELS request;
   determining whether the optical power of the optical link is a cause of an occurring link error;
   if no link errors are occurring, determining whether the optical power of the optical link is outside of a threshold range including a low optical power level threshold and a high optical power level threshold; and
   renegotiating a lower link speed for the optical link, in response to the optical power of the optical link being outside of the threshold range.

14. The non-transitory physical computer-readable storage medium of claim 13, further comprising instructions for indicating a degraded state, if the optical power of the optical link is outside of the threshold range.

15. The non-transitory physical computer-readable storage medium of claim 13, further comprising instructions for determining whether the optical power of the optical link has been decreasing or increasing, if the step of diagnosing indicates a link error.

16. The non-transitory physical computer-readable storage medium of claim 15, further comprising instructions for taking a service action not on the optical link, if a determination is made that the optical power of the optical link has not been decreasing or increasing.

17. The non-transitory physical computer-readable storage medium of claim 15, further comprising instructions for performing a proactive action indicating optical power degradation, if a determination is made that the optical power of the optical link has been decreasing or increasing.

* * * * *